US012724297B2

(12) United States Patent
Meng et al.

(10) Patent No.: US 12,724,297 B2
(45) Date of Patent: Sep. 1, 2026

(54) OPTICAL MODULATORS AND PHOTONIC INTEGRATED SYSTEMS

(71) Applicant: Shanghai Xizhi Technology Co., Ltd, Shanghai (CN)

(72) Inventors: Huaiyu Meng, Shanghai (CN); Yichen Shen, Shanghai (CN); Yanfei Bai, Shanghai (CN); Zhan Su, Shanghai (CN); Cheng-Kuan Lu, Shanghai (CN); Yelong Xu, Shanghai (CN)

(73) Assignee: SHANGHAI XIZHI TECHNOLOGY CO., LTD, Shanghai (CN)

( * ) Notice: Subject to any disclaimer, the term of this patent is extended or adjusted under 35 U.S.C. 154(b) by 1036 days.

(21) Appl. No.: 17/720,778

(22) Filed: Apr. 14, 2022

(65) Prior Publication Data

US 2022/0334418 A1 Oct. 20, 2022

(30) Foreign Application Priority Data

Apr. 16, 2021 (CN) ........................ 202110409940.6

(51) Int. Cl.
*G02F 1/025* (2006.01)
*G02F 1/01* (2006.01)
(Continued)

(52) U.S. Cl.
CPC ............ *G02F 1/025* (2013.01); *G02F 1/0121* (2013.01); *G02F 1/01708* (2013.01); *G06N 3/04* (2013.01)

(58) Field of Classification Search
CPC .. G02B 6/12004; G02B 6/134; G02B 6/1342; G02F 1/025; G02F 1/0121; G02F 1/0126;
(Continued)

(56) References Cited

U.S. PATENT DOCUMENTS 6,891,202 B2 * 5/2005 Kish, Jr. ............... H01S 5/2231 257/97
7,230,963 B2 * 6/2007 Menon ................ H01S 5/06256 372/50.1
(Continued)

FOREIGN PATENT DOCUMENTS

CN 105122469 A 12/2015
CN 109477983 A 3/2019
(Continued)

OTHER PUBLICATIONS

Notification to Grant Patent Right for Invention issued in Chinese Application No. 202110409940.6; Oct. 26, 2022; 3 pgs.
(Continued)

*Primary Examiner* — Thomas A Hollweg
*Assistant Examiner* — Mary A El-Shammaa
(74) *Attorney, Agent, or Firm* — HAUPTMAN HAM, LLP

(57) ABSTRACT

The invention relates to the field of photonic integrated circuits and provides an optical modulator and a photonic integrated system, which can suppress phase deviation caused by carrier diffusion. The optical modulator includes at least one phase shifter including a waveguide channel for transmitting optical signal, and a P-type doped region and a N-type doped region located on opposite sides of the waveguide channel. In the waveguide channel, an undoped intrinsic region is located between the P-type doped region and the N-type doped region. At least one end of the intrinsic region or close to the at least one end is provided with a blocking structure for blocking the diffusion of carriers from the intrinsic region along the waveguide propagation direction, so that the phase deviation caused by the diffusion of carriers can be suppressed, and the electrical crosstalk between adjacent phase shifters can be suppressed, thereby avoiding modulation signal distortion caused by the electri-
(Continued)

cal crosstalk. As a result, the reliability and precision of the photonic integrated system can be improved.

11 Claims, 4 Drawing Sheets

(51) Int. Cl.
*G02F 1/017* (2006.01)
*G06N 3/04* (2023.01)

(58) Field of Classification Search
CPC .... G02F 1/01708; G02F 1/011; G02F 1/0115; G02F 1/0113; G06N 3/04; G06N 3/02
See application file for complete search history.

(56) References Cited

U.S. PATENT DOCUMENTS 9,470,914 B1 * 10/2016 Djordjevic .............. G02F 1/025
10,074,959 B2 * 9/2018 Blauvelt .................... H01S 5/12
10,483,716 B2 * 11/2019 Menezo .................. H01S 5/125
10,684,527 B2 * 6/2020 Watts ................... G02B 6/1223
11,079,653 B2 * 8/2021 Watts ................... G02B 6/1223
12,272,925 B2 * 4/2025 Hjartarson ............ H01S 5/0014
2002/0097941 A1 * 7/2002 Forrest .................. H01S 5/0265 385/14
2005/0040415 A1 * 2/2005 Kish ..................... H10F 30/222 257/E31.022
2005/0089257 A1 * 4/2005 Barrios ................... G02F 1/025 385/2
2014/0248019 A1 * 9/2014 Witzens ................ G02F 1/2255 385/2
2016/0043262 A1 2/2016 Okumura
2017/0168326 A1 * 6/2017 Ogawa .................... G02F 1/025
2018/0246351 A1 * 8/2018 Ho ...................... G02F 1/01708
2020/0073154 A1 * 3/2020 Simard ................... G02F 1/025
2021/0135764 A1 * 5/2021 Lin ...................... G06N 3/0675
2021/0201126 A1 * 7/2021 Meng ........................ G02F 3/00

FOREIGN PATENT DOCUMENTS

GB 2552264 A * 1/2018 ............... G02B 6/12
WO WO-2015124954 A2 * 8/2015 ......... G02B 6/12019
WO 2018122006 A1 7/2018
WO WO-2020191217 A1 * 9/2020 ............. G02F 1/225

OTHER PUBLICATIONS

Supplementary Search issued in Chinese Application No. 202110409940.6; Oct. 18, 2022; 1 pg.
Sobu, Yohei, et al.; High-Speed-Operation of Compact All-Silicon Segmented Mach-Zehnder Modulator Integrated with Passive RC Equalizer for Optical DAC Transmitter; OFC 2020; 3 pgs.
Fu, Sidong, et al.; Electrical crosstalk suppression for a compact optical segmented modulator, Optics Express; vol. 29, No. 2, Jan. 18, 2021; pp. 1764-1773.
Search Report issued in Chinese Application No. 202110409940.6; mailed May 28, 2022, 2 pgs.
First Office Action issued in Chinese Application No. 202110409940.6; mailed Jun. 2, 2022, 18 pgs.

* cited by examiner

OPTICAL MODULATORS AND PHOTONIC INTEGRATED SYSTEMS

CROSS-REFERENCE TO RELATED APPLICATION(S)

This application claims the benefit of, and priority to, the Chinese Patent Application No. 202110409940.6, filed on Apr. 16, 2021, which is herein incorporated by reference in its entirety.

FIELD OF THE INVENTION

The invention disclosed herein relates to the field of photonic integrated circuits. More particularly, it relates to an optical modulator and a photonic integrated system.

BACKGROUND OF THE INVENTION

Artificial Neural Network (ANN) abstracts the human brain neuron network from the perspective of information processing, establishes a certain operation model, and forms different networks according to different connection methods. That is to say, the neural network is an operational model consisting of a large number of nodes (or neurons) connected to each other. Each node represents a specific output function, called the excitation function. The connection between each two nodes represents a weighted value for a signal passing through the connection, called a weight, which is equivalent to the memory of the artificial neural network. The output of the network varies according to the connection method of the network, the weight value and the excitation function. The network itself is usually an approximation of a certain algorithm or function in nature, and it may also be an expression of a logic strategy. When looking for an optimal solution to a complex problem, a large amount of computation is often required. The computing power and speed of digital electronic technology will eventually become the bottleneck of the development of artificial neural network.

Photonic neural networks have developed rapidly in recent years and are expected to increase their energy efficiency and speed by orders of magnitude compared to digital electronic technology. In photonic neural networks, optical modulators are often used. For example, carrier-injection-based silicon modulator could provide large changes of refraction index and high modulation depths in a compact footprint. In the silicon modulator, the typical PIN phase shifter has an undoped intrinsic region between two doped regions in the waveguide, which could provide high modulation efficiency with forward bias voltage. Due to its small footprint and low insertion loss, it could be widely used in large scale photonic integrated system like photonic neural network.

To achieve high-bit resolution control of optical intensity, multiple phase shifters are employed in the silicon modulator. However, there would be electrical crosstalk between adjacent phase shifters since the carriers in the waveguide core region of PIN junction could diffuse along the waveguide propagation direction. The electrical crosstalk would distort the modulated signal, thereby affecting the performance of the photonic integrated system.

SUMMARY OF THE INVENTION

In view of the above-mentioned defects in prior arts, the present invention provides an optical modulator and a photonic integrated system, which can suppress the occurrence of electrical crosstalk between adjacent phase shifters.

In one aspect, the embodiments of the present invention provide a carrier-injection-based optical modulator, the optical modulator comprising at least one phase shifter which includes a waveguide channel for transmitting optical signal, a P-type doped region and a N-type doped region located on opposite sides of the waveguide channel, and an undoped intrinsic region provided in the waveguide channel and located between the P-type doped region and the N-type doped region; and a blocking structure is provided at at least one end of the intrinsic region or close to the at least one end to block the diffusion of carriers from the intrinsic region along the waveguide propagation direction of the waveguide channel.

In some embodiments, the blocking structure includes a PN junction. In an alternative embodiment, the blocking structure may include at least two PN junctions, and the at least two PN junctions may be spaced apart from each other, or may be stacked.

In some embodiments, a tapered waveguide region is provided on both end sides of the intrinsic region, and the PN junction is formed in the tapered waveguide region.

In some embodiments, the blocking structure comprises a space formed at at least one end of the waveguide channel in the intrinsic region, or a space formed in a waveguide outside the intrinsic region and connected to at least one end of the intrinsic region.

In some embodiments, the optical modulator includes at least two phase shifters with length different from each other.

In another aspect, the embodiments of the present invention provide a carrier-injection-based optical modulator, the optical modulator comprising at least two phase shifters and a blocking structure. Each phase shifter includes a waveguide channel for transmitting optical signal, a P-type doped region and a N-type doped region located on opposite sides of the waveguide channel, and an undoped intrinsic region provided in the waveguide channel and located between the P-type doped region and the N-type doped region. The blocking structure is provided in the connecting ends of the adjacent phase shifters facing each other to block the diffusion of carriers from one phase shifter to another phase shifter along the waveguide propagation direction of the waveguide channel.

In some embodiments, the blocking structure includes a PN junction. In an alternative embodiment, the blocking structure may include at least two PN junctions, and the at least two PN junctions may be spaced apart from each other, or may be stacked.

In some embodiments, the connecting end is a tapered waveguide region.

In some embodiments, the blocking structure is a space formed in a waveguide between the adjacent phase shifters.

In some embodiments, the length of each of at least two phase shifters is different from each other.

In yet another aspect, embodiments also provide a photonic integrated system comprising the optical modulator described in any one of the foregoing embodiments.

According to the photonic integrated system and the optical modulator thereof according to the various embodiments of the present invention, the blocking structure is provided at the end of the phase shifter to block the diffusion of carriers from the intrinsic region along the waveguide propagation direction, thus the phase deviation due to the carrier diffusion can be suppressed. Therefore, it can ensure that the theoretical value of the phase shifter is substantially consistent with that of the laboratory, so that the behavior of the phase shifter can be accurately predicted and the related driving circuit can be designed.

The diffusion of carriers from one phase shifter to another phase shifter is blocked by the blocking structure such that the electrical crosstalk between adjacent phase shifters can be suppressed, thereby avoiding modulated signal distortion caused by the electrical crosstalk. As a result, the reliability and precision of the photonic integrated system can be improved.

Aspects, features, advantages and the like of the embodiments will be described in greater detail by reference to the drawings. The aspects, features, advantages and the like will be apparent according to the detailed description by reference to the drawings.

DETAILED DESCRIPTION OF THE INVENTION

In order to facilitate understanding of various aspects, features and advantages of the technical solutions of the present invention, the present invention will be described in detail below with reference to the drawings. It should be understood that the following various embodiments are only used for illustration without limiting the protection scope of the present invention.

The terminology used herein is for the purpose of describing particular embodiments and is not intended to be limiting of the present invention. As used herein, the singular forms “a” and “an” are intended to include the plural forms as well, unless the context clearly indicates otherwise. It will be further understood that the terms “comprises,” “comprising,” “includes,” and “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of,” when preceding a list of elements, modify the entire list of elements and do not modify the individual elements of the list.

Embodiments of the present invention provide a photonic integrated system, which includes the carrier-injection-based optical modulator described in the following embodiments, wherein the optical modulator includes at least two phase shifters.

Figure 1:
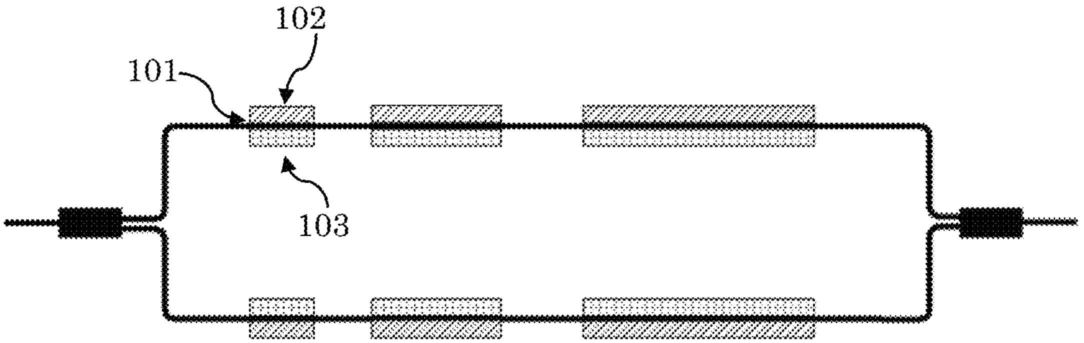
FIG. 1 is a schematic diagram of an optical modulator according to an embodiment of the present invention.
Figure 2A:
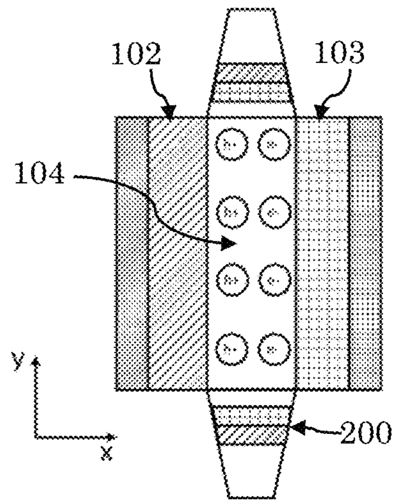
FIG. 2*a* is an enlarged view of one of the phase shifters as shown in FIG. 1.

FIG. 1 shows the structure of an optical modulator according to an embodiment of the present invention. As shown in FIG. 1, each optical path connecting the input end and the output end of the optical modulator is provided with 3 phase shifters, and the length of each phase shifter is different, so that the optical modulator can realize a 3-bit optical modulation and has 8 levels of light intensity. In an alternative embodiment, the number of phase shifter may be 1, 2, 4, or more. And the multiple phase shifters may have the same length, or some of the multiple phase shifters may have the same length. In the embodiment, the phase shifter includes a waveguide channel 101 for transmitting optical signal, and a P-type doped region 102 and a N-type doped region 103 located on opposite sides of the waveguide channel 101. As shown in FIG. 2*a*, the phase shifter further includes an undoped intrinsic region 104 formed in the waveguide channel between the P-type doped region 102 and the N-type doped region 103, thereby forming a PIN phase shifter.

Figure 2B:
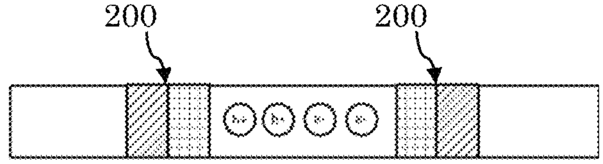
FIG. 2*b* is a cross-sectional view of the core region of the waveguide taken along the y direction as shown in FIG. 2*a*.

In the embodiment, a blocking structure is provided at connecting ends which are close to both ends of the intrinsic region 104 and connected to the intrinsic region 104 to block the outward diffusion of carriers (including electrons and holes) from the intrinsic region 104 along the waveguide propagation direction. The blocking structure is a PN junction 200. As shown in FIG. 2*a*, the connection end is a tapered waveguide region connected to the intrinsic region 104 at both ends of the intrinsic region 104, and the PN junction 200 is formed in the tapered waveguide region. As shown in FIG. 2*b*, the carriers are blocked in the intrinsic region by PN junctions 200 such that the diffusion of the carriers to another phase shifter is prevented, thereby avoiding electrical crosstalk between adjacent phase shifters, which causes phase deviation. As a result, the distortion of the modulated signal of the optical modulator can be suppressed, thereby improving the reliability and precision of the photonic integrated system. Moreover, in the design stage, it can ensure that the theoretical value of the phase shifter is substantially consistent with that of the laboratory, so that the behavior of the phase shifter can be accurately predicted and its related driving circuits can successfully be designed, thereby improving the design and manufacturing efficiency of the photonic integrated system.

It should be noted that, when the optical modulator includes only one phase shifter, a blocking structure is provided at the ends of the phase shifter to block the diffusion of carriers from the intrinsic region of the phase shifter along the waveguide propagation direction, such that the phase deviation due to carrier diffusion can also be suppressed. Therefore, it can ensure that the theoretical value of the phase shifter is substantially consistent with that of the laboratory, so that the behavior of the phase shifter can be accurately predicted and the related driving circuit can be designed. In an alternative embodiment, the blocking structure may be provided at both ends of the intrinsic region, or the blocking structure may be provided at or close to one end of the intrinsic region. For example, in the case of one-way communication or one-way optical transmission, the blocking structure can be provided only at the output end of the phase shifter, thereby preventing carriers from diffusing to the next phase shifter. Alternatively, the blocking structure may also be provided at the input end of the phase shifter to prevent the carriers of the preceding phase shifter from diffusing to the instant phase shifter.

In some of the embodiments, a blocking structure may be provided in the connecting ends of adjacent phase shifters facing each other for blocking the diffusion of carriers from one phase shifter to another phase shifter along the waveguide propagation direction, thereby it can not only prevent the carriers from diffusing from the instant phase shifter, but also prevent the carriers of the preceding phase shifter from diffusing to the instant phase shifter.

In some of the embodiments, the blocking structure is a space formed in a waveguide between adjacent phase shifter. For example, the space can be formed in the said tapered waveguide region. Thus, a physical spacing for carriers is formed between adjacent phase shifters, such that electrical crosstalk between adjacent phase shifters can be avoided. In other embodiments, the blocking structure includes a space formed at at least one end of the waveguide channel.

In certain embodiments, the optical modulator is a Mach-Zehnder modulator.

In order to facilitate those skilled in the art to understand the spirit of the present invention, the effect of the present invention will be described below with comparison to the prior design.

Figure 3:
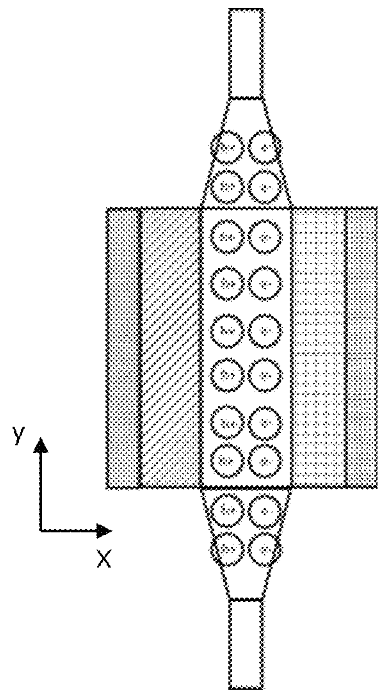
FIG. 3 is a structural schematic diagram of a PIN phase shifter of the prior design.
Figure 4:
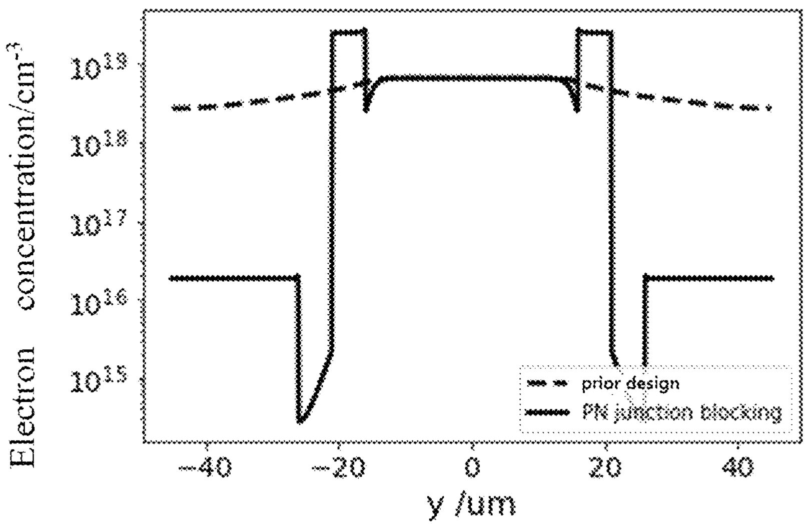
FIG. 4 is a profile showing simulation results of the PIN phase shifter shown in FIG. 2 and the PIN phase shifter shown in FIG. 3, which shows changes in electron concentration.
Figure 5:
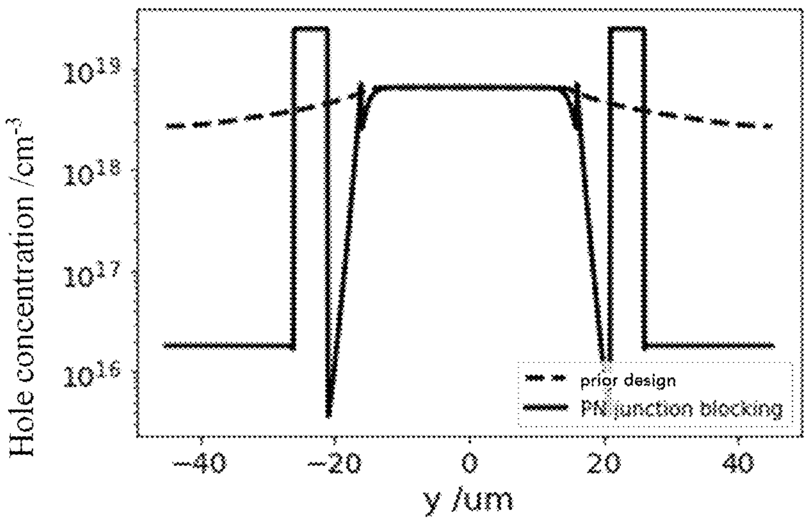
FIG. 5 is a profile showing simulation results of the PIN phase shifter shown in FIG. 2 and the PIN phase shifter shown in FIG. 3, which shows changes in hole concentration.

As shown in FIG. 3, in the design prior to the present invention, no blocking structure is provided at both ends of the intrinsic region, and the carriers can diffuse outward from the intrinsic region along the waveguide propagation direction (y direction). Therefore, the carriers can diffuse from one phase shifter to another, resulting in electrical crosstalk between the phase shifters. In contrast, in the embodiments of the present invention, by providing blocking structures at or close to both ends of the intrinsic region, the diffusion of carriers from the intrinsic region along the waveguide propagation direction (y direction) can be suppressed. FIG. 4 and FIG. 5 respectively show the change in carrier concentration along the waveguide propagation direction (y-direction). In FIG. 4, the dotted line represents the change of the electron concentration at both ends of the intrinsic region in the prior design, and the solid line represents the change of the electron concentration of the embodiment using PN junction as blocking structure. In FIG. 5, the dotted line represents the change of the hole concentration at both ends of the intrinsic region in the prior design, and the solid line represents the change of the hole concentration of the embodiment using PN junction as blocking structure. As shown in FIG. 4 and FIG. 5, compared with the prior design, by using the PN junction as blocking structure, the carrier concentration (including electrons and holes) could be reduced from 5e18/$cm^3$ to 2e16/$cm^3$ with negligible additional phase contribution. It can be seen that the PN junction blocking structure effectively inhibits the diffusion of carriers from the intrinsic region. In addition, the length of a PN junction is typically 10 μm, whose insertion loss is about 0.03 dB. Thus, it can be seen that the addition of the PN junction blocking structure hardly introduces insertion loss to the device.

Figure 6:
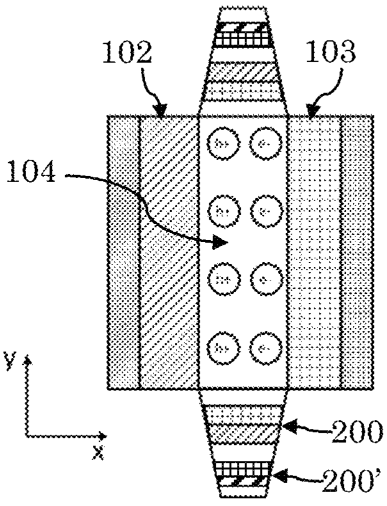
FIG. 6 shows an example of a phase shifter for an optical modulator according to another embodiment of the present invention.

FIG. 6 shows an example of a phase shifter for an optical modulator according to another embodiment of the present invention. As shown in FIG. 6, two spaced PN junctions 200 and 200' are disposed at each end of both ends close to the intrinsic region 104 of the phase shifter to further improve the capability of suppressing carrier diffusion and preventing crosstalk. In an alternative embodiment, two or more spaced PN junctions may be provided at or close to at least one end of the intrinsic region 104.

Figure 7:
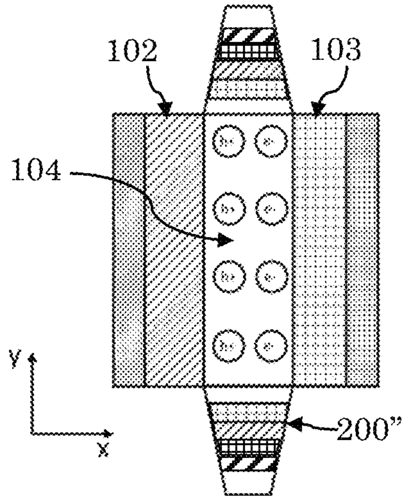
FIG. 7 shows an example of a phase shifter for an optical modulator according to yet another embodiment of the present invention.

FIG. 7 shows an example of a phase shifter for an optical modulator according to yet another embodiment of the present invention. As shown in FIG. 7, a four-layer structure 200" of PNPN comprising two stacked PN junctions is respectively disposed at both ends close to the intrinsic region 104 of the phase shifter as the blocking structure for blocking carriers to further improve the capability of suppressing carrier diffusion and preventing crosstalk. In an alternative embodiment, a four-layer structure of the PNPN, or a PN structure with more than four layers may be provided at or close to at least one end of the intrinsic region 104. In other embodiments, the blocking structure may include a structure configured as PNP or NPN.

According to various embodiments, by adding a PN junction between adjacent phase shifters, the carrier diffusion along the waveguide propagation direction could be well suppressed, and the crosstalk between the adjacent phase shifters could be well isolated. In this way, it would be easy to predict the behavior of carrier-injection-based modulator and it would be accurately controlled by the current driver. Thus, the performance of the photonic integrated system can be improved.

A person of ordinary skill in the art should understand that the various embodiments and examples disclosed herein are described for purpose of illustration only. It is not intended to be exhaustive or to limit the invention. Many modifications and variations are possible in light of the above teaching and the scope of the appended claims should be construed as broadly as the prior art will permit. For example, as the blocking structure for blocking carriers, the PN junction and the space described in the embodiments can be used in combination, and the number of the space can also be 1, 2 or more.

What we claimed is:

1. A carrier-injection-based optical modulator, comprising:

at least one phase shifter including
- a waveguide channel for transmitting optical signal,
- a P-type doped region and an N-type doped region located on opposite sides of the waveguide channel, and
- an undoped intrinsic region located between the P-type doped region and the N-type doped region in the waveguide channel;

a blocking structure provided at or close to at least one end of the intrinsic region for blocking the diffusion of carrier along the waveguide propagation direction of the waveguide channel; and a tapered waveguide region provided on both end sides of the intrinsic region, wherein the blocking structure is formed in the tapered waveguide region.

2. The optical modulator of claim 1, wherein the blocking structure comprises a PN junction.

3. The optical modulator of claim 1, comprising: at least two phase shifters with length different from each other.

4. The optical modulator of claim 1, wherein the blocking structure comprises at least two PN junctions.

5. The optical modulator of claim 4, wherein the at least two PN junctions are spaced apart from each other, or the at least two PN junctions are stacked.

6. A carrier-injection-based optical modulator, the optical modulator comprising:

at least two phase shifters; wherein each phase shifter includes a waveguide channel for transmitting optical signal, a P-type doped region and an N-type doped region located on opposite sides of the waveguide channel, and an undoped intrinsic region located between the P-type doped region and the N-type doped region in the waveguide channel;

a blocking structure provided in the ends of the adjacent phase shifters facing each other to block carriers from diffusing from one phase shifter to another phase shifter along the waveguide propagation direction of the waveguide channel; and a tapered waveguide region provided on both end sides of the intrinsic region of the each phase shifter, wherein the blocking structure is formed in the tapered waveguide region.

7. The optical modulator of claim 6, wherein the blocking structure comprises a PN junction.

8. A photonic integrated system comprising a carrier-injection-based optical modulator comprising:

at least one phase shifter including a waveguide channel for transmitting optical signal, a P-type doped region and an N-type doped region located on opposite sides of the waveguide channel, and an undoped intrinsic region located between the P-type doped region and the N-type doped region in the waveguide channel; and a blocking structure provided at or close to at least one end of the intrinsic region for blocking the diffusion of carriers along the waveguide propagation direction of the waveguide channel, wherein the blocking structure comprises a PN junction.

9. The photonic integrated system of claim 8, wherein the carrier-injection-based optical modulator further comprises a tapered waveguide region provided on both end sides of the intrinsic region, and the PN junction is formed in the tapered waveguide region.

10. The photonic integrated system of claim 8, wherein the blocking structure comprises a space formed at at least one end of the waveguide channel in the intrinsic region, or formed in a waveguide outside of the intrinsic region and connected to at least one end of the intrinsic region.

11. The photonic integrated system of claim 8, wherein the carrier-injection-based optical modulator comprises at least two phase shifters with length different from each other.

* * * * *